UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

COMPOSITION OF MATTER FOR SOUND-RECORDS OR THE LIKE AND PROCESS OF MAKING THE SAME.

1,342,326.   Specification of Letters Patent.   Patented June 1, 1920.

No Drawing.   Application filed August 26, 1915. Serial No. 47,520.

*To all whom it may concern:*

Be it known that I, THOMAS A. EDISON, a citizen of the United States, and a resident of Llewellyn Park, West Orange, New Jersey, have invented a certain new and useful Composition of Matter for Sound-Records or the Like and Process of Making the Same, of which the following is a description.

My invention relates to an improved composition of matter and to improved articles, such as sound records, formed from said composition. The principal object of my invention is to form a hard composition which does not adhere to a sound record matrix or other mold which has a high melting point, and which is insoluble in the usual solvents. I have found that such a composition can be formed by treating shellac with a condensing agent so as to cause a molecular alteration or a condensation in the shellac. The condensing agent which I prefer to use is para-phenylene-diamin. If desired, various materials, such as fillers of wood pulp or other fibrous material, may be incorporated in my improved composition.

As an example of my invention, 100 parts of shellac is dissolved in about 140 parts of alcohol and one part of paraphenylenediamin added to the solution. From 400 to 700 parts of very finely powdered dry wood pulp is then thoroughly mixed with the solution in a mixing machine, after which the composition is dried by driving off the alcohol or other solvent, as in a vacuum drier, the alcohol being preferably condensed and saved. The dried material produced in this way is then preferably ground to a very fine powder which is molded under heat and pressure in a suitable mold, the heating being carried on a sufficient time to cause the complete condensing action of the paraphenylenediamin on the shellac. The object of using the pressure is simply to cause the powder to cohere and take the proper impression from the mold. It is found that the article so formed has far less tendency to adhere to the mold than does ordinary shellac. The composition of which the article is formed is much harder than shellac and is not soluble in alcohol or the ordinary solvents, and does not melt at any temperature below that of its decomposition, the melting point being higher than that of shellac. I am not aware of its exact chemical composition.

The above described composition has been found excellent for phonograph or sound records. When such records are formed from said composition, I preferably apply to the surface of a blank of the composition a thin coating or layer of thermo plastic or readily moldable material. The surface material may, for example, be shellac, celluloid, or the final hardened phenolic condensation product described in U. S. patent to Aylsworth No. 1,111,285, in which a plasticity agent is incorporated to render the product sufficiently plastic at elevated temperatures to be molded. When the record is a flat or disk record, both faces of the same are preferably formed with a surface layer of an impressionable material.

While I have described a certain specific embodiment of my invention, it is to be understood that my invention is not limited thereto.

Having now described my invention, what I claim and desire to protect by Letters Patent is as follows:—

1. A composition of matter formed by the condensation of shellac by means of paraphenylenediamin, substantially as described.

2. A composition of matter formed by heating shellac with paraphenylenediamin, substantially as described.

3. A composition of matter formed by the condensation of shellac by means of paraphenylenediamin, under heat and pressure, substantially as described.

4. A composition of matter comprising a finely divided filler and a binder formed of a condensation product of shellac and paraphenylenediamin, substantially as described.

5. A composition of matter comprising a finely divided fibrous filler and a binder formed of a condensation product of shellac and paraphenylenediamin, substantially as described.

6. A composition of matter comprising a finely divided filler and a binder of a condensation product of shellac and paraphenylenediamin, the filler being in excess of the binder, substantially as described.

7. A sound record containing a condensation product of shellac and paraphenylenediamin, substantially as described, 8. A composition of matter formed by the condensation of shellac by means of phenylenediamin, substantially as described.

9. A sound record containing a condensation product of shellac, substantially as described.

10. The process which comprises heating shellac with phenylenediamin, substantially as described.

11. The process which comprises heating shellac with paraphenylenediamin, substantially as described.

12. The process which comprises heating shellac with paraphenylenediamin under formative pressure, substantially as described.

13. A composition of matter formed by the condensation of shellac.

14. A composition of matter formed by heating shellac with a condensing agent to a temperature sufficient to cause condensation of the shellac.

15. A composition of matter formed by heating shellac under pressure with a condensing agent to a temperature sufficient to cause condensation of the shellac.

16. A process which comprises heating shellac with a condensing agent to a temperature sufficient to cause condensation of the shellac.

This specification signed and witnessed this 21st day of August, 1915.

THOS. A. EDISON.

Witnesses:
FREDERICK BACHMANN,
J. UNGER.